US006870945B2

(12) United States Patent
Schoepflin et al.

(10) Patent No.: US 6,870,945 B2
(45) Date of Patent: Mar. 22, 2005

(54) VIDEO OBJECT TRACKING BY ESTIMATING AND SUBTRACTING BACKGROUND

(75) Inventors: Todd Schoepflin, Seattle, WA (US); David R. Haynor, Seattle, WA (US); John D. Sahr, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 612 days.

(21) Appl. No.: 09/874,160

(22) Filed: Jun. 4, 2001

(65) Prior Publication Data

US 2003/0044045 A1 Mar. 6, 2003

(51) Int. Cl.[7] .................................................. G06K 9/00
(52) U.S. Cl. ........................ 382/103; 382/107; 348/169
(58) Field of Search ................................. 382/103, 107, 382/236; 348/169, 170, 171, 172, 97, 154, 155, 208.1, 208.2, 208.4, 208.13, 208.16, 220.1, 352, 402.1, 407.1, 413.1, 451, 452, 620, 669, 699, 700, 586, 587

(56) References Cited

U.S. PATENT DOCUMENTS

| | | | | |
|---|---|---|---|---|
| 5,491,517 A | * | 2/1996 | Kreitman et al. | 348/581 |
| 5,526,053 A | * | 6/1996 | Dorricott et al. | 348/443 |
| 5,710,602 A | * | 1/1998 | Gardos et al. | 348/586 |
| 5,852,475 A | * | 12/1998 | Gupta et al. | 348/606 |
| 6,400,831 B2 | * | 6/2002 | Lee et al. | 382/103 |
| 6,545,706 B1 | * | 4/2003 | Edwards et al. | 348/169 |

OTHER PUBLICATIONS

Giaccone, P. et al.: "Segmenting Image Sequences by Embedding Motion and Colour Cues Within a Contextual Relaxation Scheme;" IEEE Colloquium on Motion Analysis and Tracking, p. 18/1–6, 1999.
Vincent, L. et al.; "Watersheds in Digital Spaces: An Efficient Algorithm Based on Immersion Simulations;" IEEE Trans. PAMI, vol. 13, pp 583–598, 1991.
Smolic, A. et al.; "Long–term Global Motion Estimation and its Application for Sprite Coding, Content Description, and Segmentation;" IEEE Trans. Circuits Syst. Video Technol., vol. 9, pp 1227–1242, 1999.
Stauder, J. et al.; "Detection of Moving Cast Shadows for Object Segmentation" IEEE Trans. Multimdeia, vol. 1, pp 65–76, 1999.

* cited by examiner

Primary Examiner—Bhavesh M. Mehta
Assistant Examiner—Abolfazi Tabatabai
(74) Attorney, Agent, or Firm—Steven P. Koda

(57) ABSTRACT

An object is tracked among a plurality of image frames. In an initial frame an operator selects an object. The object is distinguished from the remaining background portion of the image to yield a background and a foreground. A model of the background is used and updated in subsequent frames. A model of the foreground is used and updated in the subsequent frames. Pixels in subsequent frames are classified as belonging to the background or the foreground. In subsequent frames, decisions are made, including: which pixels do not belong to the background; which pixels in the foreground are to be updated; which pixels in the background were observed incorrectly in the current frame; and which background pixels are being observed for the first time. In addition, mask filtering is performed to correct errors, eliminate small islands and maintain spatial and temporal coherency of a foreground mask.

27 Claims, 5 Drawing Sheets

FIG.7A
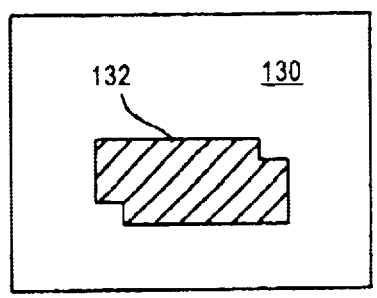
FIG.7B
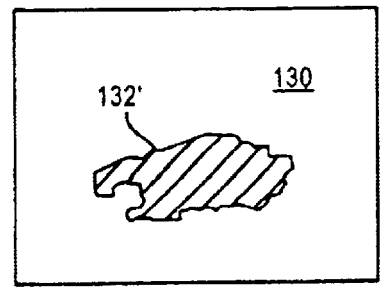
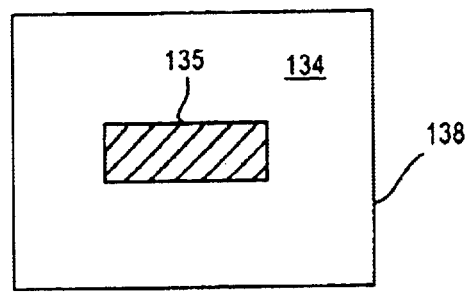
FIG.8A
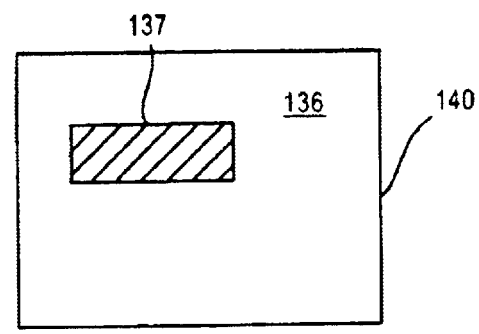
FIG.8B

VIDEO OBJECT TRACKING BY ESTIMATING AND SUBTRACTING BACKGROUND

BACKGROUND OF THE INVENTION

This invention relates to digital graphics, and more particularly to a method and apparatus for digital image object tracking and segmentation.

In composing and manipulating digital images for providing special effects in movie and video clips and for a variety of other imaging and graphics applications, image objects are identified and tracked. In movies, for example, image objects are inserted or manipulated to alter a scene in a realistic manner. Objects or regions from still frames or photographs are inserted into a sequence of frames to create a realistic image sequence.

Segmentation is a technique in which an object within an image is traced so that it may be extracted. Among the earliest segmentation methods is a manual method in which an operator manually selects points along a boundary of the object to outline the image. The points then are connected to formed a closed object. For example, straight lines have been used to connect the points. The more points selected the more accurate the outline.

An active contour based segmentation process improves on the manually selected rough approximation using an edge energy function. The edge energy function is computed based on a combination of internal forces relating to curve energy and external forces related to image gradient magnitude. The active contour minimizes the edge energy function to approximate the object boundary in an iterative process.

One shortcoming of edge based tracking and segmentation methods is the difficulty in identifying video objects or object portions with a rapidly changing shape. For example tracking a human leg during a scene where the person is walking is difficult because the shape of the leg is continually changing. Difficulties also arise in tracking objects or object portions which are being occluded and disoccluded in various image frames. Accordingly, an alternative approach to object tracking is desired which is able to track rapidly moving objects and objects which are being occluded and disoccluded in various frames.

SUMMARY OF THE INVENTION

According to the invention, an object is tracked among a plurality of image frames. In an initial frame an operator selects an object to be tracked. The selected object or a revised estimation of the selected object is distinguished from the remaining background portion of the image to yield a background mask and a foreground mask. The foreground mask corresponds to the object to be tracked. A model of the background mask is used and updated in subsequent frames, and a model of the foreground mask is used and updated in subsequent frames. Pixels in subsequent frames are classified as belonging to the background or the foreground.

In each subsequent frame, decisions are made, including: which pixels do not belong to the background; which pixels in the foreground (based on the original image) are to be updated; which pixels in the background were observed incorrectly in the current frame; and which background pixels are being observed for the first time. Some of these decisions need not be mutually exclusive of the other decisions.

In addition to classifying pixels, mask filtering is performed to correct errors, eliminate small islands and maintain spatial and temporal coherency of a foreground mask. Object tracking is achieved using a small output delay. In one embodiment a three frame latency is adopted.

An advantage of the invention is that objects having rapidly changes shapes are accurately tracked against a motionless background. Information in prior and future frames is used to detect object motion. the object can change internally and even be self-occluding. Another advantage is that previously unrevealed (i.e., occluded) portions of the background are identified, improving object estimation accuracy. Another advantage is that holes in objects also are tracked accurately.

These and other aspects and advantages of the invention will be better understood by reference to the following detailed description taken in conjunction with the accompanying drawings.

BRIEF DESCRIPTION OF THE DRAWINGS

FIGS. 7a and 7b are representations of a background model at two times during processing of an image sequence; and FIGS. 8a and 8b are depictions of respective background masks for two different image frames among a sequence of image frames.

DESCRIPTION OF SPECIFIC EMBODIMENTS

Exemplary Processing Environment

Figure 1:
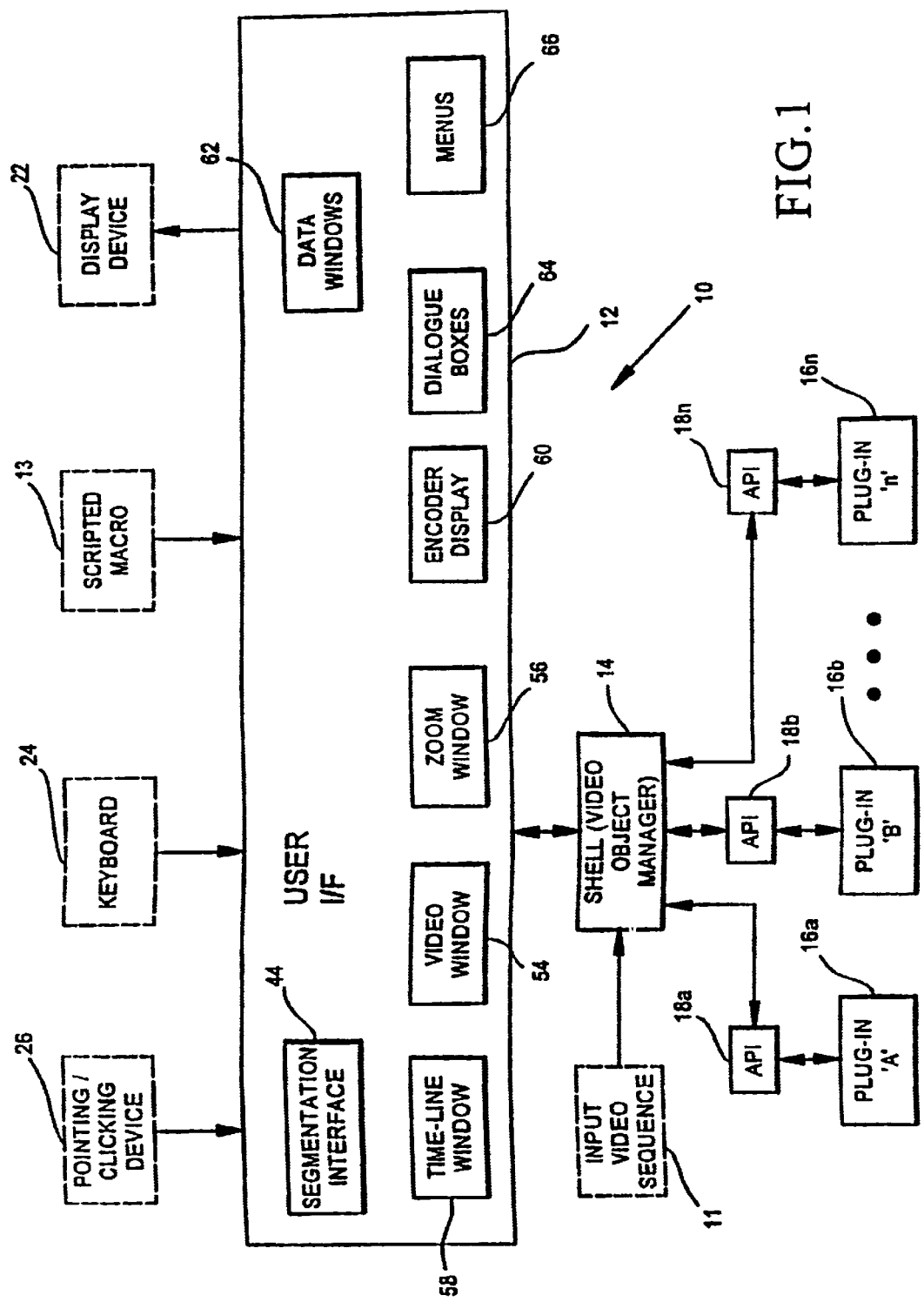
FIG. 1 is a block diagram of an interactive processing environment for tracking video objects among a sequence of video frames.

FIG. 1 shows a block diagram of an exemplary host interactive processing environment 10 for locating, tracking and encoding video objects. The processing environment 10 includes a user interface 12, a shell environment 14 and a plurality of functional software 'plug-in' programs 16. The user interface receives and distributes operator inputs from various input sources, such as a point and clicking device 26 (e.g., mouse, touch pad, track ball), a key entry device 24 (e.g., a keyboard), or a prerecorded scripted macro 13. The user interface 12 also controls formatting outputs to a display device 22. The shell environment 14 controls interaction between plug-ins 16 and the user interface 12. An input video sequence 11 is input to the shell environment 14. Various plug-in programs 16a–16n may process all or a portion of the video sequence 11. One benefit of the shell 14 is to insulate the plug-in programs from the various formats of potential video sequence inputs. Each plug-in program interfaces to the shell through an application program interface ('API') module 18.

Figure 2:
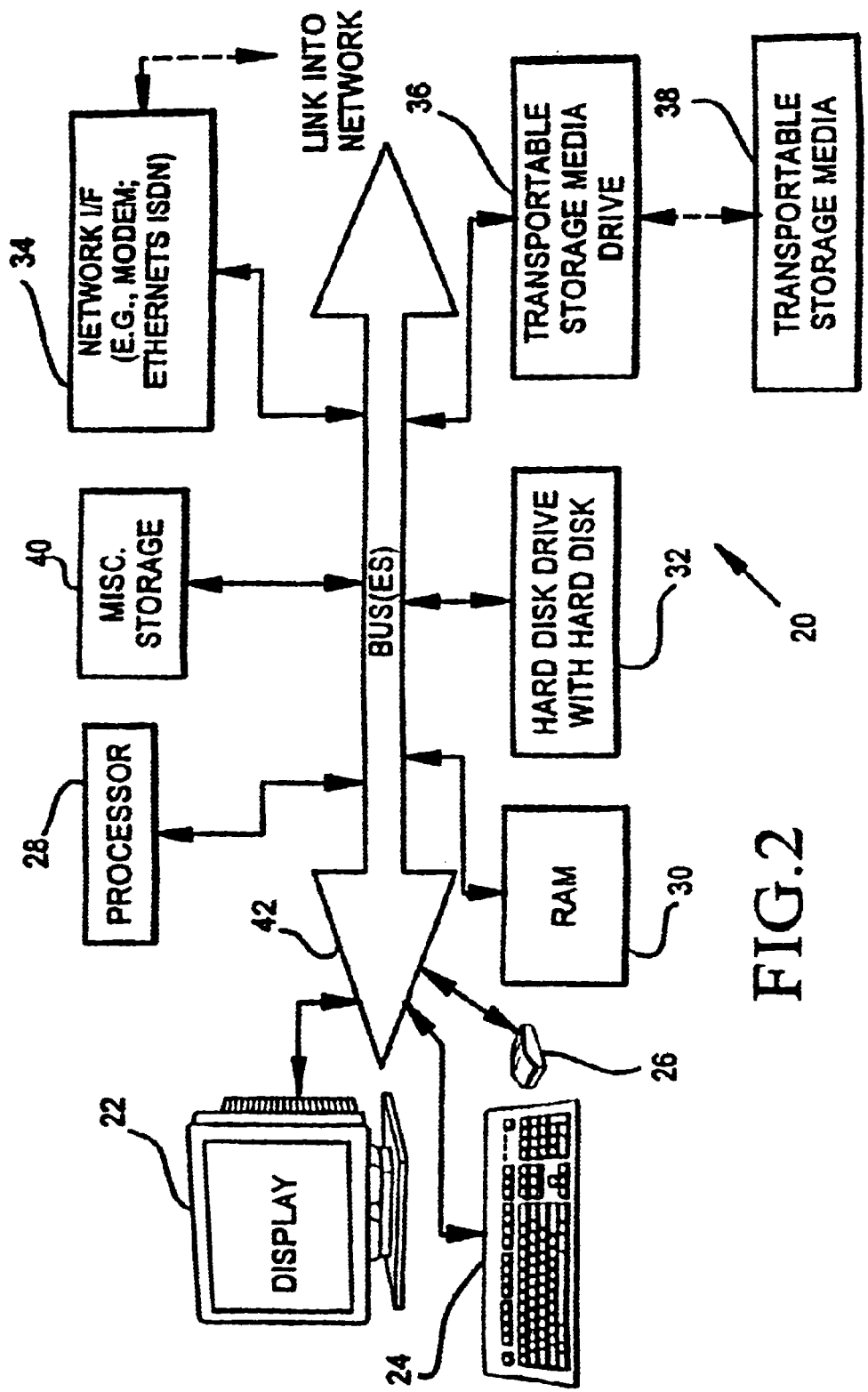
FIG. 2 is a block diagram of an exemplary host computing system for the interactive processing environment of FIG. 1.

In one embodiment the interactive processing environment 10 is implemented on a programmed digital computer of the type which is well known in the art, an example of which is shown in FIG. 2. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more buses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer, a networked client computer or a stand alone computer. The computer system 20 may even be configured as a workstation, personal computer, or a reduced-feature network terminal device.

In another embodiment the interactive processing environment 10 is implemented in an embedded system. The embedded system includes similar digital processing devices and peripherals as the programmed digital computer described above. In addition, there are one or more input devices or output devices for a specific implementation, such as image capturing.

Software code for implementing the user interface 12 and shell environment 14, including computer executable instructions and computer readable data are stored on a digital processor readable storage media, such as embedded memory, RAM, ROM, a hard disk, an optical disk, a floppy disk, a magneto-optical disk, an electro-optical disk, or another known or to be implemented transportable or non-transportable processor readable storage media. Similarly, each one of the plug-ins 16 and the corresponding API 18, including digital processor executable instructions and processor readable data are stored on a processor readable storage media, such as embedded memory, RAM, ROM, a hard disk, an optical disk, a floppy disk, a magneto-optical disk, an electro-optical disk, or another known or to be implemented transportable or non-transportable processor readable storage media. The plug-ins 16 (with the corresponding API 18) may be bundled individually on separate storage media or together on a common storage medium. Further, none, one or more of the plug-ins 16 and the corresponding API's 18 may be bundled with the user interface 12 and shell environment 14. Further, the various software programs and plug-ins may be distributed or executed electronically over a network, such as a global computer network.

Under various computing models, the software programs making up the processing environment 10 are installed at an end user computer or accessed remotely. For stand alone computing models, the executable instructions and data may be loaded into volatile or non-volatile memory accessible to the stand alone computer. For non-resident computer models, the executable instructions and data may be processed locally or at a remote computer with outputs routed to the local computer and operator inputs received from the local computer. One skilled in the art will appreciate the many computing configurations that may be implemented. For non-resident computing models, the software programs may be stored locally or at a server computer on a public or private, local or wide area network, or even on a global computer network. The executable instructions may be run either at the end user computer or at the server computer with the data being displayed at the end user's display device.

Shell Environment and User Interface

The shell environment 14 allows an operator to work in an interactive environment to develop, test or use various video processing and enhancement tools. In particular, plug-ins for video object segmentation, video object tracking and video encoding (e.g., compression) are supported in a preferred embodiment. The interactive environment 10 with the shell 14 provides a useful environment for creating video content, such as MPEG-4 video content or content for another video format. A pull-down menu or a pop up window is implemented allowing an operator to select a plug-in to process one or more video frames.

In a specific embodiment the shell 14 includes a video object manager. A plug-in program 16, such as a segmentation program accesses a frame of video data, along with a set of user inputs through the shell environment 14. A segmentation plug-in program identifies a video object within a video frame. The video object data is routed to the shell 14 which stores the data within the video object manager module. Such video object data then can be accessed by the same or another plug-in 16, such as a tracking program. The tracking program identifies the video object in subsequent video frames. Data identifying the video object in each frame is routed to the video object manager module. In effect video object data is extracted for each video frame in which the video object is tracked. When an operator completes all video object extraction, editing or filtering of a video sequence, an encoder plug-in 16 may be activated to encode the finalized video sequence into a desired format. Using such a plug-in architecture, the segmentation and tracking plug-ins do not need to interface to the encoder plug-in. Further, such plug-ins do not need to support reading of several video file formats or create video output formats. The shell handles video input compatibility issues, while the user interface handles display formatting issues. The encoder plug-in handles creating a run-time video sequence.

For a Microsoft Windows operating system environment, the plug-ins 16 are compiled as dynamic link libraries. At processing environment 10 run time, the shell 14 scans a predefined directory for plug-in programs. When present, a plug-in program name is added to a list which is displayed in a window or menu for user selection. When an operator selects to run a plug-in 16, the corresponding dynamic link library is loaded into memory and a processor begins executing instructions from one of a set of pre-defined entry points for the plug-in. To access a video sequence and video object segmentations, a plug-in uses a set of callback functions. A plug-in interfaces to the shell program 14 through a corresponding application program interface module 18.

In addition, there is a segmentation interface 44 portion of the user interface 12 which is supported by a segmentation plug-in. The segmentation interface 44 makes calls to a segmentation plug-in to support operator selected segmentation commands (e.g., to execute a segmentation plug-in, configure a segmentation plug-in, or perform a boundary selection/edit).

The API's 18 typically allow the corresponding plug-in to access specific data structures on a linked need-to-access basis only. For example, an API serves to fetch a frame of video data, retrieve video object data from the video object manager, or store video object data with the video object manager. The separation of plug-ins and the interfacing through API's allows the plug-ins to be written in differing program languages and under differing programming environments than those used to create the user interface 12 and shell 14. In one embodiment the user interface 12 and shell 14 are written in C++. The plug-ins can be written in any language, such as the C programming language.

In a specific embodiment each plug-in 16 is executed in a separate processing thread. As a result, the user interface 12 may display a dialog box that plug-ins can use to display progress, and from which a user can make a selection to stop or pause the plug-in's execution.

Referring again to FIG. 1, the user interface 12 includes the segmentation interface 44 and various display windows 54–62, dialogue boxes 64, menus 66 and button bars 68, along with supporting software code for formatting and maintaining such displays. In a preferred embodiment the user interface is defined by a main window within which a user selects one or more subordinate windows, each of which may be concurrently active at a given time. The subordinate windows may be opened or closed, moved and resized.

In a preferred embodiment there are several subordinate windows 52, including a video window 54, a zoom window 56, a time-line window 58, one or more encoder display windows 60, and one or more data windows 62. The video window 54 displays a video frame or a sequence of frames. For viewing a sequence of frames, the frames may be stepped, viewed in real time, viewed in slow motion or viewed in accelerated time. Included are input controls accessible to the operator by pointing and clicking, or by predefined key sequences. There are stop, pause, play, back, forward, step and other VCR-like controls for controlling the video presentation in the video window 54. In some embodiments there are scaling and scrolling controls also for the video window 54.

The zoom window 56 displays a zoom view of a portion of the video window 54 at a substantially larger magnification than the video window. The time-line window 58 includes an incremental time-line of video frames, along with zero or more thumb nail views of select video frames. The time line window 58 also includes a respective time-line for each video object defined for the input video sequence 11. A video object is defined by outlining the object.

The data window 62 includes user-input fields for an object title, translucent mask color, encoding target bit rate, search range and other parameters for use in defining and encoding the corresponding video object.

During encoding one of the encoder windows 60 is displayed. For example, an encoder progress window shows the encoding status for each defined video object in the input video sequence 11.

Object Tracking

Figure 3:
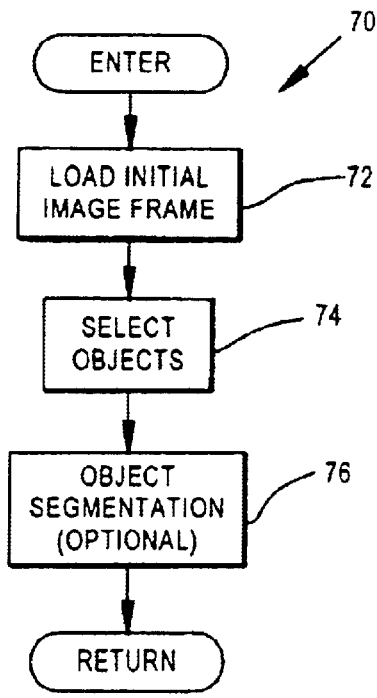
FIG. 3 is a flow chart for an initial object selection process.

Prior to performing the tracking operations based on background separation, an initial process 70 is executed (see FIG. 3). At a first step 72, the operator loads in an initial image frame. Using, for example, the segmentation interface 44, the operator clicks on points along the border of the object to be tracked, or otherwise selects an object at step 74. Optionally, an object segmentation algorithm then is executed on the selected object at step 76 to better estimate the object border. An active contour model or other known technique is implemented to achieve the object segmentation. The result of step 74, or if performed, step 76 is an object mask, (i.e., a foreground mask).

Figure 4:
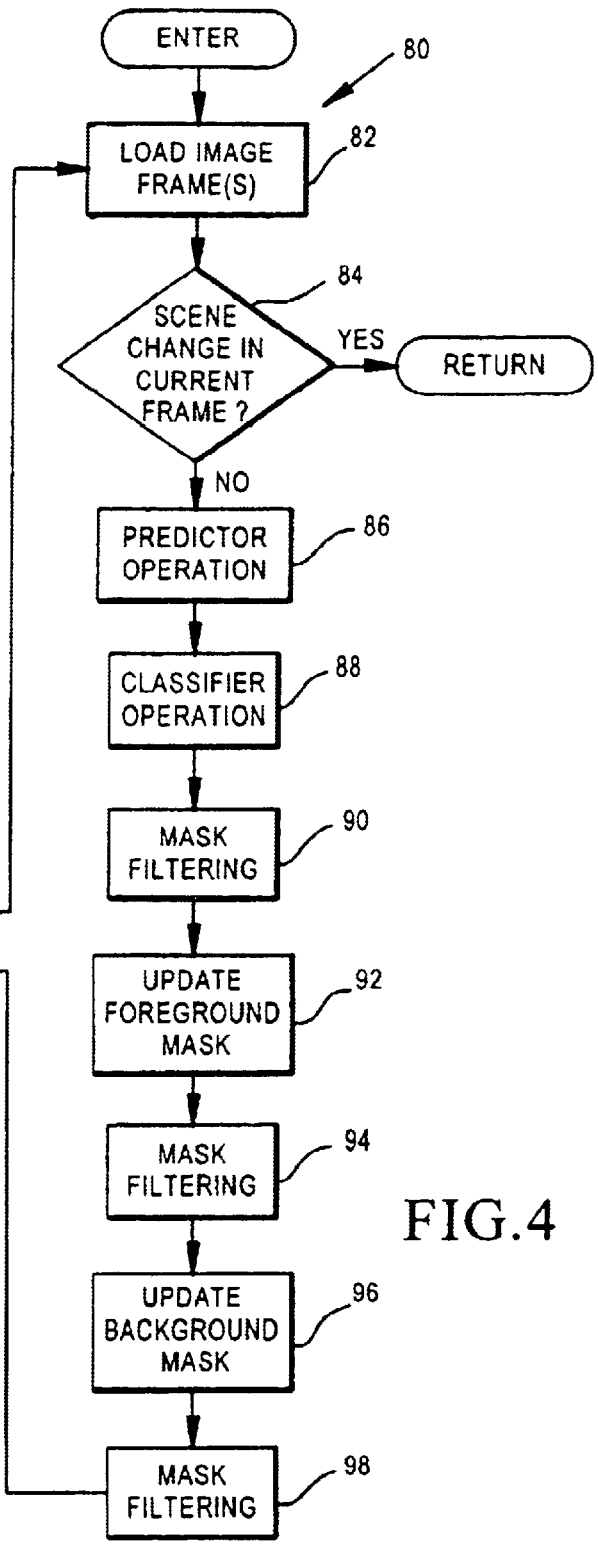
FIG. 4 is a flow chart of a process for tracking a video object by estimating and subtracting the background.

Referring to FIG. 4, an object tracking process 80 (ProcessVideoSequence) is performed to track the selected object among a sequence of image frames. Object tracking commences with the loading of image frames. At a first step 82, an image frame is loaded. During the first pass two image frames are loaded—a current image frame (k) and a next image frame (k+1). In each subsequent iteration a subsequent image frame (k+i; where i is 2, 3, 4, . . . ) is loaded. Thus, in a first pass the current frame is frame k and processing involves looking at the pixels of frames k and k+1. For the next pass, frame k+2 is input. Frame k+1 becomes the current frame and processing involves looking at the pixels from frames k+1 and k+2.

In some embodiments a scene change detection algorithm also is implemented for each frame (step 84) to determine whether a scene change has occurred. If a scene change has occurred in the current image frame, then the tracking process ends or is re-initialized. If not, tracking continues.

The general strategy for tracking is to perform a predictor operation at step 86 and a classifier operation at step 88. The predictor operation predicts the background and updates the predictor with current frame image data. The classifier operation 88 classifies the current image frame pixels into background pixels and foreground pixels. Optional mask filtering operations are performed at steps 90, 94 and 98. The filtering operations serve to correct small errors, eliminate small islands, and maintain spatial and temporal coherency of the foreground (object) mask. The foreground and background models are updated at steps 92 and 96, respectively. Also, an optional mask editing and interpolation step is performed at step 100 to add another check on temporal coherency. In some embodiments the foreground mask then is output at step 101 to an object segmentation plug-in to refine the boundary estimate for the foreground model (i.e., object). For example an active contour type model is implemented in one embodiment. The process 80 then repeats with another frame being input at step 82 and the process repeated for a next frame to be processed. The process continues for either a select number of image frames (e.g., as selected by an operator), until the end of a given frame sequence, or in some embodiments, until a scene change is detected.

Figure 5A:
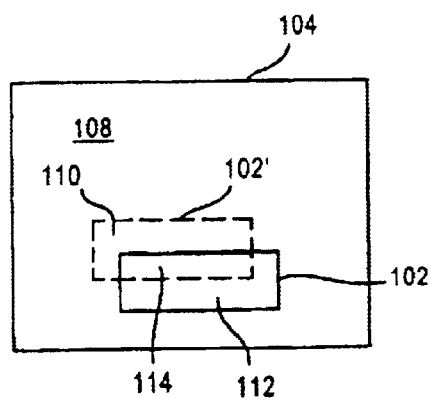
FIGS. 5a and 5b are depictions of an image frame with an object positioned at differing position within the image field.
Figure 5B:
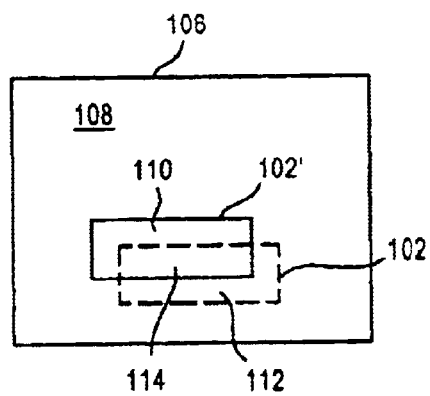

Referring to FIGS. 5a and 5b, an object 102 is tracked among two successive frames 104, 106. In a first frame 104 the object 102 is in a first position relative to the background 108. In the second frame 106 the object 102' has moved relative to the generally stable background 108. In frame 106 the object has moved to occlude an area 110 of the background which was visible in the prior image frame 104. Also, the object has disoccluded an area 112 of the background that was occluded in the prior image frame 104. The intersection of the areas occluded by the object 102 as positioned in frames 104 and 106 is an area 114. The area 114 is an area of the background which is occluded in both frames 104, 106.

During object tracking, there is a foreground object occluding a portion of the background in the initial image frame. During subsequent image frames, background pixels within that initially occluded area may be revealed. The object tracking processes detect the newly-disoccluded pixels and adds them to the background model.

The background model is a model of the entire background 108. The background 108 is generally stable, preferably stationary. In some embodiments however, the background may be moving. In such embodiment a correlation function is implemented to account for movement of the background. A complete background model includes data for every pixel in the background. Initially, the model is not complete as some pixels are not yet revealed. As pixels are revealed, the data is added to the background model after being visible for a prescribed number of successive frames, (see RollbackOrNewObservations module).

In a preferred embodiment three successive frames is used as the criteria based upon empirical analysis. In other embodiments the criteria is for four or higher successive frames. The number of successive frames used for a given embodiment is based on a trade-off between a tendency to update the background too quickly using a low number of successive frames and a tendency to wait too long to update the background using a higher number of successive frames. When too few successive frames are used, the model erroneously detects a foreground pixel as being part of the background until another motion occurs to change the analysis. When too many successive frames are used before updating the model, the process may miss the opportunity to correctly observe the background. Specifically, the image may be changing too fast relative to the prescribed number of successive frames causing the motion to have passed during such number of frames, (e.g., a motion occurs in 3 frames, but the criteria is 5 successive frames so the pixels of the motion are not registered). Empirically, updating after 1 or 2 successive frames often yields mistakes in observing the background of moving image scenes. Accordingly, it is preferred to use 3 or more successive frames as the criteria. Note, however, that in an embodiment for processing a slow motion video sequence, the prescribed number can be as low as 1 or 2 successive frames.

The background mask is the portion of the current image frame which includes pixels classified as background pixels, plus any other pixels which are added to the background mask for the current image frame after mask filtering of the foreground mask. The foreground mask for the current image frame includes the pixels not in the background mask. Predictor:

For an initial frame, the object derived at steps 74 and 76 (see FIG. 3) is used to distinguish/observe the background. It is assumed that the operator accurately selects the object during process 70. However, by considering additional frames, the predictor operation 86 refines the background and foreground masks. There are two guides for avoiding being too quick to categorize a pixel. One is that any unobserved pixel which becomes observed in a subsequent frame is not added to the background model until it has been observed in three successive frames. Thus, the pixels in area 112 which became disoccluded in frame 106 are not added to the background model unless they also appear disoccluded in the ensuing two subsequent image frames. Second, any background pixel observed in the initial image frame, but that changes substantially in the next frame is relabeled as being unobserved in the background model. (These pixels were observed as being background pixels in only one frame, not three consecutive frames). This guide is to avoid classifying a pixel on the object boundary as being a background pixel. Such case occurs where the operator makes an inaccurate selection of the object boundary. It is desirable not to label the pixel as observed until further processing evidences that the pixel is not part of the moving boundary.

The second guide described above not only identifies mis-selected pixels, but also undesirably identifies, for example, the pixels in area 110 which became occluded in the second frame 106. Such pixels in area 110 are relabeled for frame 104 as being unobserved. Thus, the background model for the initial frame includes all pixels in the background 108, excluding those pixels in areas 110, 112, 114 (see FIGS. 5a, 5b). The predictor operation 86 identifies such pixels in background 108 less those pixels in areas 110, 112, 114, as being in the background mask for the current image frame and the remaining pixels as being in the foreground mask for the current image frame. During subsequent processing the pixels in area 110 may become disoccluded and added to the background model.

In some embodiments a second pass of the initial image frame is performed after the image frame sequence is processed. During the second pass the refined models developed over the course of processing the image frame sequence are used to recapture some or all of the pixels in area 110 that indeed are background pixels.

For a current image frame, the predictor analyzes each color component of each pixel using a 0-th or 1-st order Kalman filter (i.e., 3×M×N independent Kalman filters for a three-color-component image with M×N pixels with one filter for each color component of each pixel). The Kalman filters remove 'noise' from the image based on a noise model and previous observations of the background. Based on the noise model, the Kalman filter updates its estimate of the background image using the new data.

In one embodiment a discrete-time model is assumed for implementing the Kalman filters with the following state-update and state-observation column vector equations:

$$x_k = A_k x_{k-1} + v_k$$

$$y_k = C_k x_k + w_k$$

where k is the k-th image frame; $x_k$ is the current state; $y_k$ is the current observation; and $A_k$ and $C_k$ are the state-update and state-output matrices, respectively. Also, $v_k$ and $w_k$ are assumed to be additive Gaussian noise vectors with cross-correlation matrices $Q_k = v_k v_k^T$ and $R_k = w_k w_k^T$. The purpose of the Kalman filter is to eliminate unobservable internal system state x from noisy output measurements y.

Two time-invariant state models are as follows. A 0-th order constant position model has matrices $A_k = [1]$ and $C_k = [1]$, where the state vector x is the value of the color component ("position"). A 1-st order constant-velocity model has matrices, $$A_k = \begin{bmatrix} 1 & 1 \\ 0 & 1 \end{bmatrix} \text{ and } C_k = \begin{bmatrix} 1 & 0 \\ 0 & 1 \end{bmatrix}$$

with a state vector including color component values and its derivative, i.e., $x^T = [\text{position; velocity}]$ in a physical model. It then is assumed that the quantity $I_k(i,j) - I_{k-1}(i,j)$ provides a measurement (observation) of the velocity, where $I_k(i,j)$ is the image pixel at coordinate (i,j) for image frame k.

The Kalman filter recipe for the 0-th order model is:
$P_{0,0}$ = covariance matrix of the initial measurement $\hat{x}_{0|0}$
Repeat for all times:

$$P_{k,k-1} = A_{k-1} P_{k-1,k-1} A_{k-1}^T + Q_{k-1}$$

$$G_k = P_{k,k-1} C_k^T (C_k P_{k,k-1} C_k^T + R_k)^{-1}$$

$$P_{k,k} = (I - G_k C_k) P_{k,k-1}$$

$$\bar{x} = \hat{x}_{k|k-1} = A_{k-1} \hat{x}_{k-1|k-1}$$

$$\hat{x}_{k|k} = \bar{x}_k + G_k(y_k - C_k \bar{x}_k)$$

where $P_{k,k-1}$ is the estimated variance of predicted value $\bar{x}_k$;
$P_{k,k}$ is the estimated variance of the best estimate $\hat{x}_k$;
$G_k$ is the Kalman gain (weight placed on difference between measurement and prediction);
$\hat{x}_{k|k}$ is the optimal estimate of $x_k$ given all history through time k; and
$\bar{x}_k = \hat{x}_{k|k-1}$ is the prediction of $x_k$, given the history through time k−1—the variable of interest.

The matrices Q and R are assumed to be diagonal, containing noise variances. The variances are determined empirically by analyzing temporal pixel data and by observing tracking performance with different values. It was found in several experiments that performance was constant for a range of variance values. Because the noise variance is low, the Kalman gain quickly converges to a constant mixing factor of about 0.15, indicating that the background estimate places a low weight on previous background observations. Given such characteristics, the update equation for estimating background pixel (i,j) for a 0-th order Kalman filter converges to:

$$x_{i,j}[n]=(1-\rho)\cdot y_{i,j}[n]+\rho\cdot x_{i,j}[n-1]$$

where x[n] is the current background estimate; x[n−1] is the previous background estimate; y[n] is the current observation; and ρ is the mixing factor.

As previously described, a background pixel is observed (non-occluded) in three consecutive frames as being a background pixel before it is added to an observed mask to update the background model. For a 1-st order filter it also is preferred that the state variables not be updated while the background pixel is not observed (e.g., occluded or not yet classified as observed) to avoid accumulating an error due to the finite velocity of the 1-st order filter variables.

Although a 0-th order and 1-st order Kalman filter are described for predicting which pixels are observed in the background versus unobserved, other models may be implemented in alternative embodiments. Other methods for the predictor operation include neural networks, digital finite impulse response filters, and infinite impulse response filters. Regardless of the specific method, a preferred tracking strategy relies on the absolute difference between the predicted background and the current frame to determine the foreground mask.

Referring to FIG. 5a, the predictor operation 86 identifies the pixels in background 108 less those pixels in areas 110, 112, 114, as being in the background mask for the first image frame and the remaining pixels as being in the foreground mask for such first image frame. During subsequent processing the pixels in area 110, 112 or 114 may become disoccluded and added to the background model.

Classifier Operation

There are several decisions performed by the classifier operation 88, including: identifying which pixels do not belong to the background mask for a current frame; which pixels in the foreground mask are to be updated for the current frame; which background pixels (if any) were observed incorrectly in the current frame, and which background pixels were observed in the background for the first time. By first time it is meant that the pixel has been observed in the background for three consecutive frames and is now to be included in the background model. By incorrectly observed, it is meant that the value of the pixel has changed significantly from the prior frame to the current frame, such that it is possible that the pixel actually is not a background pixel. (The background is assumed to be generally stable). For embodiments which account for background motion this change in value is identified after accounting for background motion.

The classifier operation 88 examines pixels in frames n−1, n and n+1 to accurately detect motion for frame n. According to a preferred embodiment, the absolute difference between images is calculated for each of three color components (e.g., YUV) of each pixel. The following absolute difference images are calculated:

between the current frame (n) and the foreground model, (AD_FG);

between the current frame (n) and the previous frame (n−1), (AD_previous);

between the current frame (n) and the predicted background estimate, (AD_predicted); and between the current frame (n) and the next frame (n+1), (AD_future).

It has been found that color components U and V exhibit differences even when the intensity component (Y) does not. Conversely, pixels with low intensity often vary little in the U and V components, so it is desirable to use thresholds to enable detection of differences under a variety of lighting and texture conditions. The four absolute difference images are used to detect a variety of events for a given pixel, including: whether the pixel belongs to the background; whether there is low motion in the immediate past; whether there is low motion in the immediate future; whether there is some motion in the immediate past; whether there is some motion in the immediate future; whether the pixel is a candidate for a foreground mask/model update; when a background pixel, whether the pixel should be updated in the background model. Table 1 below lists the event with the relevant absolute difference image.

TABLE 1

Detection of various events using the absolute difference for each color component.

| Event Description | Relevant AD image | Pixel value | Logical Combination of Color Thresholds |
|---|---|---|---|
| Pixel may belong to background | AD_previous OR AD_future; AD_predicted | small small | AND |
| Low motion in immediate past | AD_previous | small | AND |
| Low motion in immediate future | AD_future | small | AND |
| Some motion in immediate past | AD_previous | significant | OR |
| Some motion in immediate future | AD_future | significant | OR |
| Pixel is candidate for foreground update | AD_FG AD_future | significant small | OR AND |
| Background pixel should not be updated | AD_previous AD_predicted | significant significant | OR OR |

Referring to table 1, an AND color combination is implemented where the event occurs for all three color components of a pixel. An OR color combination is implemented when the event occurs for any color component. The events in Table 1 are used in combination to make decisions, including: which pixels do not belong to the background; which pixels in the foreground (based on the original image) are to be updated; which pixels in the background were observed incorrectly in the current frame; and which background pixels are being observed for the first time. Some of these decisions need not be mutually exclusive of the other decisions. Decision logic for one embodiment is listed in the pseudocode section MainThreshold (initial detections of hanged pixels).

The result of the classifier operation 88 is: an updated background model and foreground model; and, for the current image frame, an updated background mask and foreground mask.

Mask Filtering and Model Updating

Figure 6:
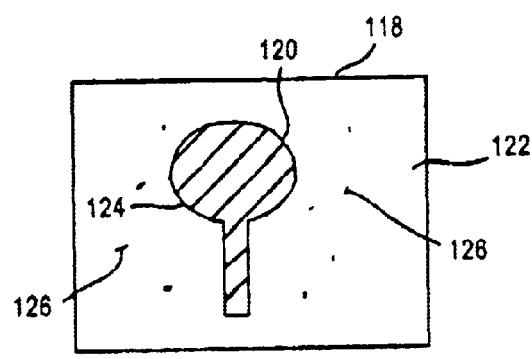
FIG. 6 is a depiction of an image frame after pixel predictor and classifier functions are performed, and prior to mask filtering operations.

After the classifier operation 88 is performed on the current image frame, there may be small errors, islands or other aberrations. For example, FIG. 6 shows a sample background mask and foreground mask after the classifier operation 88 is performed for an image frame 118 for an object 120. The result is a background mask 122 and a foreground mask 124/126. The foreground mask includes those pixels in area 124 corresponding to the object 120, plus pixels 126 which are small islands, errors and other aberrations. Referred to herein categorically as spots, these pixels are illustrated in FIG. 6 as black spots outside the large island 124. The background mask 122 includes all other pixels in frame 118, (i.e., all pixels in frame 118, less those in island 124 and in spots 126).

A mask filtering operation is performed in various steps 90, 94, 98 to correct the small errors, to eliminate small islands, and maintain a spatial and temporal coherency of the background mask and foreground mask of the current image frame with the background and foreground mask of the prior image frame. At step 90, filtering is performed to identify the largest island of foreground pixels in the foreground mask. In one embodiment a connected components analysis is performed to identify and retain the largest island. At step 92 the foreground mask for the current image frame is updated by removing the remaining islands and spots 126. In some embodiments morphological processing also is performed on the largest island 124 to obtain the foreground mask. This leaves only the area 124 as the foreground mask for the current image.

At step 94 mask filtering is performed on the background mask of the current image frame. In one embodiment a mask erosion operation is performed. The erosion operation includes both temporal differences and spatial similarities between pixels to erode the foreground pixels using a flooding procedure, (FloodFG).

In one embodiment the erosion operation includes a flooding procedure in which a FIFO queue is filled using the background pixels at the interface with the foreground mask. Each pixel is examined in the queue, until the queue is empty. If any pixel of the foreground mask neighboring pixels is sufficiently similar to a parent pixel at the foreground background interface, and such pixel has low future motion (as determined by the classifier operation 88), the pixel is added to the queue and is relabeled as a background pixel (i.e., added to the background mask for the current frame). Note that pixels in the queue inherit the YUV values of the parent pixel at the background foreground interface rather than the immediate ancestor. This prevents major erosion of the foreground mask when a pixel in a nearly homogeneous region is erroneously detected as a background pixel. In other embodiments, more rigorous testing is performed by gathering statistics from a window of pixels surrounding the pixel being evaluated.

After the flooding procedure a binary morphological closing is performed to smooth the background mask and correct any small errors introduced by the flooding procedure. For example, in one embodiment a 5×5 structuring element is used in the morphological processing. Because the mask filtering operation performed at step 94 may introduce small islands of background pixels within the border of the foreground mask, morphological and connected component analysis is preferably implemented to detect and change these small islands to part of the foreground mask. Islands of significant size (exceeding a threshold defined for the morphological operation) remain in the background mask. Such procedure is beneficial to fill in chunks of the foreground mask that may have been incorrectly missing.

The result of the mask erosion operation is a new background mask. The background model then is updated at step 96. Specifically, at step 96 the pixels in the background mask are examined to determine if there are any previously unobserved pixels. If so, then those pixels are stored, but not yet added to the background model. Once any one of such pixels have observed in three consecutive frames, the observed pixel(s) are added to the background model.

After updating the background model at step 96, additional mask filtering is performed at step 98 to remove any remaining fragments or features in the background mask for the current frame that are less than a select number of pixels wide, (e.g., 3 pixels, although another number is used in other embodiments). For example, in one embodiment the mask is morphologically opened using a 3×3 structuring element to remove the fragments less than 3 pixels wide.

At step 100, the background mask and foreground mask for each of the frames n, n−1 and n−2 (where n is the current image frame) are examined to edit and interpolate the mask pixels. As previously discussed, new background pixels are to be observed in three consecutive frames to be included in the background model. Thus, if a new background pixel observed at frame n−2 is NOT observed in either frame n−1 or n, then the corresponding background mask pixel is reset to a foreground mask pixel for frame n−2, and the background pixel is not updated. In addition, if the temporal pattern for a pixel in frames n−2, n−1, and n is unobserved, observed, unobserved, then the pixel at frame n−1 is relabeled as unobserved. By looking ahead to frame n+1 and looking back to frame n−2, the final output value for the pixel is actually delayed for a total of three frames. However, a preliminary result is available after one frame.

Referring to FIGS. 7a and 7b, the background model 130 is shown at two different times during processing of an image sequence. FIG. 7a shows the background model 130 as including all pixels on an image field, except for an area 132 of unobserved pixels. Over subsequent frames, the background model gradually expands and the area of the unobserved pixels remaining gradually erodes. In this example, by the time of FIG. 7b, the background model 130 has expanded leaving a smaller area 132' of unobserved pixels. Note that area 132' is a subset of the earlier area 132. In the extreme example, the background model 130 is expanded over subsequent frames to encompass the entire pixel area, (i.e., no area 132 remaining, and correspondingly no unobserved background pixels). Note that for purposes of illustration the background model 130 is shown as being a blank white area in FIGS. 7a and 7b. In practice, however, the background model is a background image upon which a foreground object moves. The background model, thus, includes pixel data in RGB, YUV, YCrCb or other image data format. In practice, the unobserved pixels (area 132) are shown as blank pixels, (e.g., white; black; or any other color where all the unobserved pixels are displayed as being the same prescribed color) in a display of the background model.

Referring to FIGS. 8a and 8b, a background mask is shown for two image frames 138, 140. In frame 138, the background mask includes the pixels in area 134 and omits those pixels in area 135 as being either occluded or unobserved. In frame 140 (which need not be a successive frame) the background mask includes the pixels in area 136, but omits those pixels in area 137 as being occluded or unobserved. Consider the case where the background model 130 at the time of frame 140 is the extreme example with no previously unobserved pixels. Comparing the background mask of FIG. 8b with the extreme example of the background model, the background pixels in area 137 of frame 140 are merely occluded. Note, however, that they have been observed previously and entered into the background model 130.

Tracking Process 80 Logic

The decision-making operations occur at several abstraction levels. These are described procedurally in pseudocode fragments as follows, with deeper levels labeled with larger numbers. FG=foreground, BG=background. Equivalent labels are UNOBSV (unobserved) and OBSV (observed), respectively. Multiple criteria in the same image are assumed to be ordered Y,Cr,Cb. The criteria are AND'd together unless otherwise specified (e.g., AD_previous<= 5,3,3 is equivalent to AD_previous_Y<=5 AND AD_previous_Cr<=3 AND AD_previous_Cb<=3).

Following is a cross reference of the process 80 steps (shown in FIG. 4) with the pseudocode logic modules below:

Predictor Operation 86 Modules: Get predicted BG based on history; GetColorPlanes( ) for time steps n−1, n, and n+1; GetDifferenceImages( ); and UpdateKalmanFilter( ).

Classifier Operation 88 Modules: MainThreshold; and UpdateOriginal.

Mask Filtering Operations 90, 94, 98: Part of ObserveBG/FG; FloodFG; PostProcessMorphology Update Foreground Mask 92, Update Background Mask 96:
   RollbackOrNewObservation.

Edit and Interpolate Masks 100: EditMasks

Level 1 Module:
ProcessVideoSequence (Retrieve Images, Calculate Absolute Differences, Update Kalman Filter, etc.)
   Old BG_estimate=Current BG_estimate
   Get predicted BG based on history
   GetColorPlanes( ) for time steps n−1, n, and n+1
   GetDifferenceImages( )
   UpdateKalmanFilter( )
   ObserveBG/FG( )
   RollbackOrNewObservation (input=FG_mask)
   Morphological_Open(Morphological_Erode(FG_mask))
   EditMasks( )
   Write final mask (FG3)
Level 2 Modules:
ObserveBG/FG (Main Routine to Separate BG/FG)
   I2=Mask_FG=MainThreshold( )
   Iconn=ConnectedComponents4(Mask_FG, use FG pixels)
   Mask_FG=choose largest island from Iconn
   UpdateOriginalImage(I2)
   Remove BG holes internal to Mask_FG if they are <500 pixels in size (use Iconn)
   FloodFG( )
   Morphological_Close(Mask_FG, 2 pixels)
   PostProcessMorphology( )
RollbackOrNewObservations
Let: AD_BG=|Frame_Current−Frame_Predicted|, AD_FG=|Frame_Current−Frame_Original|, Mask_FG1=segmentation mask from the previous frame.
1. Roll back some BG observations (let Estimated_BG[pixel]=Estimated_old_BG[pixel])
2. If pixel is FG in Mask_FG (i.e., it was never observed)
3. If pixel in BG varies too much
4.a) Compare Mask_FG and Mask_FG1 and locate new BG observations. Update these pixels in Estimated_BG directly with the current observation.b) Update Observed_Once for new BG pixels
Specific Procedure:
For all pixels, operate pixel-wise:
If Mask_FG=UNOBSV then
   Estimated=Estimated_old
Else if Obsverved_Once==OBSV AND Mask_FG1== OBSV
   Boolean1=AD_previous: Y>6 OR Cb>4 OR Cr>4
   Boolean2=AD_future: Y>6 OR Cb>4 OR Cr>4
   If (AD_predicted: Y>20 AND (Cb>3 OR Cr>3) AND Boolean1 AND
   Boolean2) OR (AD_predicted: Y>15 AND (Cb>5 OR Cr>5) AND Boolean1 AND Boolean2) OR (AD_previous: Y>10 OR Cb>5 OR Cr>5) then
      Estimated=Estimated_old
If ObservedOnce=OBSV
   If Frame_Current_Y>70
      If AD_FG: Y>40 OR Cb>8 OR Cr>8 then
         Estimated=Estimated_old
   Else
      If AD_FG: Y>18 OR Cb>8 OR Cr>8 then
         Estimated=Estimated_old
   ObsvCnt=0
   I2=0
Else If (ObservedOnce==UNOBSV AND Mask_FG== OBSV) then
   ObsvCnt++
   If ObsvCnt>2
      ObservedOnce=OBSV
      Estimated=Frame_Current
      Frame_orig=Frame_Current
   Else (roll back)
      Estimated=Estimated_old
   I2=NEW_BG1 (mark special as first BG observation)
Else (pixel never observed and not observed in current frame)
   I2=0 (not special)
   ObsvCnt=0 (keep resetting obsv cnt)
EditMasks
   Use I2 to mark pixels in Mask_FG as new background observations. We edit masks at times n−1 and n−2 using masks at n, n−1, and n−2. If any future mask has a "recovery" of a background observation, we "unobserve" it in the past.
   We also interpolate for Unobsv Obsv Unobsv pattern in time and set the middle pixel to UNOBSV
   Inputs: I2 contains a 0 or NEW_BG1 label
   Mask_FG, FG1, FG2, FG3 are masks for time steps n, n−1, n−2, n−3
   Outputs: Mask_FG: Modified to change all new BG pixel labels from OBSV to NEW_BG1
   FG3: all NEW_BG pixels modified to UNOBSV or OBSV
For All Pixels
   If I2==NEW_BG1 then Mask_FG=NEW_BG
   If FG3=NEW_BG
      If any future mask(FG1,2,3)==UNOBSV
         FG3=UNOBSV (roll it back)
      Else
         FG3=OBSV
Remove flickers from FG1 & FG2
If FG2,FG1, Mask_FG==UOU then FG1=UNOBSV
If FG3,FG2,FG1==UOU then FG2=UNOBSV
If Current_Frame>3 then FG3=Morph_Close(FG3,1 pixel)
   (this forces the time interpolation to occur chunk-wise)
Level 3 Modules:
MainThreshold (Initial Detection of Changed Pixels)
Returns a Mask with Each Pixel Labeled as BG or FG
For Each Pixel in the Image
   If previously observed If high intensity (Y_current>70)
    If prediction "good" (AD_predicted<=5,3,3)
        OR {AD_predicted<=40,3,3 AND low motion from previous or future frames (AD_previous<=5,3,3 AND AD_future<=5,3,3)}
    Then pixel=BG ("observed")
    Else
        Pixel=FG ("unobserved")
Else if low intensity (Y_current<=70)
    If prediction "good" (AD_predicted<=4,2,2)
        OR {AD_predicted<=18,2,2 AND low motion from previous or future frames (AD_previous<=3,2,2 AND AD_future<=3,2,2)}
    Then pixel=BG ("observed")
    Else
        Pixel=FG ("unobserved")
Else since never observed, detect new BG:
    If AD_future<=5,3,3 AND {AD_predicted: Y>max(10,min(25,Y_current) OR Cb>5 or Cr>5} then
        Pixel=new BG
    Else
        Pixel=FG
UpdateOriginal (Update Frame Original to Reflect Majorly Changed Pixels)
    Remove one pixel from the boundary of Mask_FG (e.g., using morphological erosion followed by subtraction) and place the result in I1
    Iconn=ConnectedComponents8(I1, use OBSV pixels as the foreground for this algorithm).
    Label islands with <1000 pixels with label 0
    Scan all pixels:
    If Iconn=0 (FG) AND Mask_FG=OBSV AND Mask_ObsvervedOnce=UNOBSV
        If (AD_predicted: Y>26 OR Cb>3 OR Cr>3) AND AD_fut<=5,3,3
            Then update Frame Original pixel with current observation
        Else don't update
    Else don't update
FloodFG (Flood the FG in Mask FG Using Adjacent BG Pixels)
Note: AD_spatial is the absolute difference between the central pixel under consideration and its 4-neighbors, in all 3 color planes (Y, Cr, Cb).
    Add pixels to FIFO list: any pixel in Mask_FG that is BG with a FG neighbor
    Do Until FIFO queue is empty:
    If Mask_FG pixel=BG
        For each 4-neighbor
            If Mask_FG pixel=UNOBSV AND similar to central pixel
            (AD_spatial<=2,0,0) AND AD_prev<=5,3,3 AND AD_future<=5,3,3
            THEN
                New BG Observation(mark Mask_FG=BG)
                ADD to FIFO queue
PostProcessMorphology (Use Morphology to Postprocess Mask FG)
    I1=Mask_FG
    I2=Largest island from ConnectedComponents4(erode(Mask_FG, UNOBSV))
    Add pixels back from the BG (false UNOBSV islands)
    I2=dilate(I2, 1)
    Iconn=ConnectedComponents4(I2, using OBSV as foreground label)
    Let I3 be empty (all labeled BG/OBSV)
    For all islands that survived dilation
    If island<=100 pixels, add it to I3 (labeled FG/UNOBSV)
    I4=dilate(I3, 1) (restore islands to normal size)
    I3=erode(I3, 1) (shrink I3 back to normal)
    I2=OR(I3, I4) (add in the OBSV'd islands: I2=mask+ islands)
    I4=AND(I2, NOT(I1)) (Extract new pixels not in I1 yet: I4=new pixels from dilation and islands)
    Mask_FG=OR(I4, Mask_FG) (add in new pixels, contained in I4)
Meritorious and Advantageous Effects An advantage of the invention is that objects having rapidly changing shapes are accurately tracked. Information in prior and future frames is used to detect object motion. The object can change internally and even be self-occluding. Another advantage is that previously unrevealed (i.e., occluded) portions of the background are identified, improving object estimation accuracy. Another advantage is that holes in objects also are tracked accurately.

The tracking strategy described works best under specific conditions. When those conditions are not met, tracking still occurs, but there are potential instances of partial inaccuracy. Various filtering operations, however, limit those potential inaccuracies. Exemplary conditions, include:

the background is constant or changes very gradually with little or no object-background interaction;

the intensity (Y) component of a background pixel may vary widely from frame to frame, but the U and V components are generally consistent;

the user provides a fairly good initial separation of the foreground object from the background (although incorrectly labeled background pixels derived from that separation in the initial frame can be detected in the next frame by pixel-wise absolute difference);

background pixels revealed in subsequent frames are visible for more than a prescribed number of frames (e.g., 3 frames);

candidates for a revealed background pixel have a large absolute difference between the current pixel and the foreground estimates, but little difference from values of the background pixel in subsequent frames; and the scene has good contrast.

In some embodiments, however, a correlation algorithm or another process is implemented to estimate and account for background motion.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for tracking an object among a plurality of image frames, the object moving relative to a background, wherein portions of the background that are initially hidden, become observable during tracking, the method comprising the steps of:

defining a background mask for each one frame among a plurality of image frames, including a current image frame, the background mask of a given image frame comprising background pixels, the background pixels of the given image frame being within observable portions of the background for the given image frame;

deriving a background model from the plurality of image frames, wherein for each image frame, background pixels within an observable portion of the background are identified, and wherein an identified background pixel is included in the background model only after being observable within the background for at least three consecutive image frames;

classifying each one pixel of the current image frame as being a background pixel or a foreground pixel based on the background model, the current image frame, and at least one of a prior image frame and a subsequent image frame;

defining a foreground mask for the current image frame as being pixels not in the background mask for said current image frame; and identifying the object as being the pixels within the foreground mask for the current image frame.

2. The method of claim 1, further comprising the step of performing a mask filtering operation on the background mask of the current image frame to decide whether to change a pixel classification from being a background pixel in the background mask to being a foreground pixel in the foreground mask of the current image frame.

3. The method of claim 1, further comprising the step of performing a mask filtering operation on the foreground mask of the current image frame to decide whether to change a pixel classification from being a foreground pixel in the foreground mask to being a background pixel in the background mask of the current image frame.

4. The method of claim 1, further comprising, for each one pixel of a current image frame, the step of predicting a background value for said one pixel based upon a predicted background value of said one pixel from the prior image frame, a pixel value of said one pixel from the current image frame, and a mixing factor.

5. The method of claim 4, in which the step of classifying said each one pixel of the current image frame is based in part on the predicted background value for said each one pixel.

6. The method of claim 1, in which the step of classifying comprises identifying an event from the group of events comprising: prospectively include said one pixel in the background mask for the current image frame; motion is detected in the immediate past for said one pixel; motion is detected in the immediate future for said one pixel; prospectively include said one pixel in the foreground pixel for the current image frame; and said one pixel is not to be updated in the background model.

7. The method of claim 1, in which the step of classifying comprises identifying an event from the group of events comprising: prospectively include said one pixel in the background mask for the current image frame; a first degree of motion is detected in the immediate past for said one pixel; the first degree of motion is detected in the immediate future for said one pixel; a second degree of motion is detected in the immediate past for said one pixel; the second degree of motion is detected in the immediate future for said one pixel; prospectively include said one pixel in the foreground pixel for the current image frame; and said one pixel is not to be updated in the background model.

8. An apparatus for tracking an object among a plurality of image frames, the apparatus receiving an initial estimate of the object for an initial image frame, the object moving relative to a background, wherein portions of the background that are initially hidden, become observable during tracking, the apparatus comprising:

a background model derived from the plurality of image frames, wherein for each image frame, background pixels within an observable portion of the background are identified, and wherein an identified background pixel is included in the background model only after being observable within the background for at least three consecutive image frames;

a processor which classifies each one pixel of the current image frame as being a background pixel or a foreground pixel based on a current state of the background model, the current image frame, and at least one of a prior image frame or a subsequent image frame, the processor identifying a background mask for the current image frame; and a foreground mask for the current image frame formed as being pixels not in the background mask for said current image frame, wherein the object being tracked is identified as corresponding to the pixels within the foreground mask of the current image frame.

9. The apparatus of claim 8, further comprising a filter which filters the background mask of the current image frame to decide whether to change a pixel classification from being a background pixel in the background mask to being a foreground pixel in the foreground mask of the current image frame.

10. The apparatus of claim 8, further comprising a filter which filters the foreground mask of the current image frame to decide whether to change a pixel classification from being a foreground pixel in the foreground mask to being a background pixel in the background mask of the current image frame.

11. The apparatus of claim 8, in which the processor predicts a background value for said each one pixel based upon a predicted background value of said each one pixel from the prior image frame, a pixel value of said each one pixel from the current image frame, and a mixing factor.

12. The apparatus of claim 11, in which the processor classifies said each one pixel of the current image frame based in part on the predicted background value for said each one pixel.

13. The apparatus of claim 8, in which the classifying by the processor comprises identifying an event from the group of events comprising: prospectively include said one pixel in the background mask for the current image frame; motion is detected in the immediate past for said one pixel; motion is detected in the immediate future for said one pixel; prospectively include said one pixel in the foreground pixel for the current image frame; and said one pixel is not to be updated in the background model.

14. The apparatus of claim 8, in which the classifying by the processor comprises identifying an event from the group of events comprising: prospectively include said one pixel in the background mask for the current image frame; a first degree of motion is detected in the immediate past for said one pixel; the first degree of motion is detected in the immediate future for said one pixel; a second degree of motion is detected in the immediate past for said one pixel; the second degree of motion is detected in the immediate future for said one pixel; prospectively include said one pixel in the foreground pixel for the current image frame; and said one pixel is not to be updated in the background model.

15. A method for tracking an object among a plurality of image frames, the method comprising the steps of:

defining a background mask for each one frame among a plurality of image frames, including a current image frame, the background mask of a given image frame comprising background pixels, the background pixels of the given image frame being observable for the given image frame;

maintaining a background model of background pixels which have been observable in at least three consecutive image frames by predicting, for each one pixel of a current image frame, a background value for said one pixel based upon a predicted background value of said one pixel from the prior image frame, a pixel value of said one pixel from the current image frame, and a mixing factor for weighting the background value of said one pixel from the prior image frame;

classifying each one pixel of the current image frame as being a background pixel or a foreground pixel based on the background model, the current image frame, and at least one of a prior image frame and a subsequent image frame;

defining a foreground mask for the current image frame as being pixels not in the background mask for said current image frame; and identifying the object as being the pixels within the foreground mask for the current image frame.

16. The method of claim 15, in which the step of classifying said each one pixel of the current image frame is based in part on the predicted background value for said each one pixel.

17. The method of claim 15, further comprising the step of performing a mask filtering operation on the background mask of the current image frame to decide whether to change a pixel classification from being a background pixel in the background mask to being a foreground pixel in the foreground mask of the current image frame.

18. The method of claim 15, further comprising the step of performing a mask filtering operation on the foreground mask of the current image frame to decide whether to change a pixel classification from being a foreground pixel in the foreground mask to being a background pixel in the background mask of the current image frame.

19. A method for tracking an object among a plurality of image frames, the method comprising the steps of:

defining a background mask for each one frame among a plurality of image frames, including a current image frame, the background mask of a given image frame comprising background pixels, the background pixels of the given image frame being observable for the given image frame;

maintaining a background model of background pixels which have been observable in at least three consecutive image frames;

classifying each one pixel of the current image frame as being a background pixel or a foreground pixel based on the background model, the current image frame, and at least one of a prior image frame and a subsequent image frame;

defining a foreground mask for the current image frame as being pixels not in the background mask for said current image frame; and identifying the object as being the pixels within the foreground mask for the current image frame;

wherein the step of classifying comprises identifying an event from the group of events comprising: prospectively include said one pixel in the background mask for the current image frame; motion is detected in the immediate past for said one pixel; motion is detected in the immediate future for said one pixel; prospectively include said one pixel in the foreground pixel for the current image frame; and said one pixel is not to be updated in the background model.

20. The method of claim 19, further comprising the step of performing a mask filtering operation on the background mask of the current image frame to decide whether to change a pixel classification from being a background pixel in the background mask to being a foreground pixel in the foreground mask of the current image frame.

21. The method of claim 19, further comprising the step of performing a mask filtering operation on the foreground mask of the current image frame to decide whether to change a pixel classification from being a foreground pixel in the foreground mask to being a background pixel in the background mask of the current image frame.

22. A method for tracking an object among a plurality of image frames, the method comprising the steps of:

defining a background mask for each one frame among a plurality of image frames, including a current image frame, the background mask of a given image frame comprising background pixels, the background pixels of the given image frame being observable for the given image frame;

maintaining a background model of background pixels which have been observable in at least three consecutive image frames;

classifying each one pixel of the current image frame as being a background pixel or a foreground pixel based on the background model, the current image frame, and at least one of a prior image frame and a subsequent image frame;

defining a foreground mask for the current image frame as being pixels not in the background mask for said current image frame; and identifying the object as being the pixels within the foreground mask for the current image frame; and wherein the step of classifying comprises identifying an event from the group of events comprising: prospectively include said one pixel in the background mask for the current image frame; a first degree of motion is detected in the immediate past for said one pixel; the first degree of motion is detected in the immediate future for said one pixel; a second degree of motion is detected in the immediate past for said one pixel; the second degree of motion is detected in the immediate future for said one pixel; prospectively include said one pixel in the foreground pixel for the current image frame; and said one pixel is not to be updated in the background model.

23. The method of claim 22, further comprising the step of performing a mask filtering operation on the background mask of the current image frame to decide whether to change a pixel classification from being a background pixel in the background mask to being a foreground pixel in the foreground mask of the current image frame.

24. The method of claim 22, further comprising the step of performing a mask filtering operation on the foreground mask of the current image frame to decide whether to change a pixel classification from being a foreground pixel in the foreground mask to being a background pixel in the background mask of the current image frame.

25. An apparatus for tracking an object among a plurality of image frames, the apparatus receiving an initial estimate of the object for an initial image frame, the apparatus comprising:

a background model of values for a plurality of background pixels which have been observable in at least three consecutive image frames;

a first processor which predicts a background value for said each one pixel based upon a predicted background value of said each one pixel from the prior image frame, a pixel value of said each one pixel from the current image frame, and a mixing factor for weighting the background value of said one pixel from the prior image frame;

a second processor which classifies each one pixel of the current image frame as being a background pixel or a foreground pixel based on the background model, the current image frame, and at least one of a prior image frame or a subsequent image frame, the processor identifying a background mask for the current image frame; and a foreground mask for the current image frame formed as being pixels not in the background mask for said current image frame, wherein the object being tracked is identified as corresponding to the pixels within the foreground mask of the current image frame.

26. An apparatus for tracking an object among a plurality of image frames, the apparatus receiving an initial estimate of the object for an initial image frame, the apparatus comprising:

a background model of values for a plurality of background pixels which have been observable in at least three consecutive image frames;

a processor which classifies each one pixel of the current image frame as being a background pixel or a foreground pixel based on the background model, the current image frame, and at least one of a prior image frame or a subsequent image frame, the processor identifying a background mask for the current image frame; and a foreground mask for the current image frame formed as being pixels not in the background mask for said current image frame, wherein the object being tracked is identified as corresponding to the pixels within the foreground mask of the current image frame;

wherein the processor identifies an event from the group of events comprising: prospectively include said one pixel in the background mask for the current image frame; motion is detected in the immediate past for said one pixel; motion is detected in the immediate future for said one pixel; prospectively include said one pixel in the foreground pixel for the current image frame; and said one pixel is not to be updated in the background model.

27. An apparatus for tracking an object among a plurality of image frames, the apparatus receiving an initial estimate of the object for an initial image frame, the apparatus comprising:

a background model of values for a plurality of background pixels which have been observable in at least three consecutive image frames;

a processor which classifies each one pixel of the current image frame as being a background pixel or a foreground pixel based on the background model, the current image frame, and at least one of a prior image frame or a subsequent image frame, the processor identifying a background mask for the current image frame; and a foreground mask for the current image frame formed as being pixels not in the background mask for said current image frame, wherein the object being tracked is identified as corresponding to the pixels within the foreground mask of the current image frame;

wherein the processor identifies an event from the group of events comprising: prospectively include said one pixel in the background mask for the current image frame; a first degree of motion is detected in the immediate past for said one pixel; the first degree of motion is detected in the immediate future for said one pixel; a second degree of motion is detected in the immediate past for said one pixel; the second degree of motion is detected in the immediate future for said one pixel; prospectively include said one pixel in the foreground pixel for the current image frame; and said one pixel is not to be updated in the background model.

* * * * *